Jan. 22, 1963 R. T. DE MUTH ETAL 3,074,688
GAS TURBINE DRIVE HAVING OIL PUMP
Filed April 27, 1959
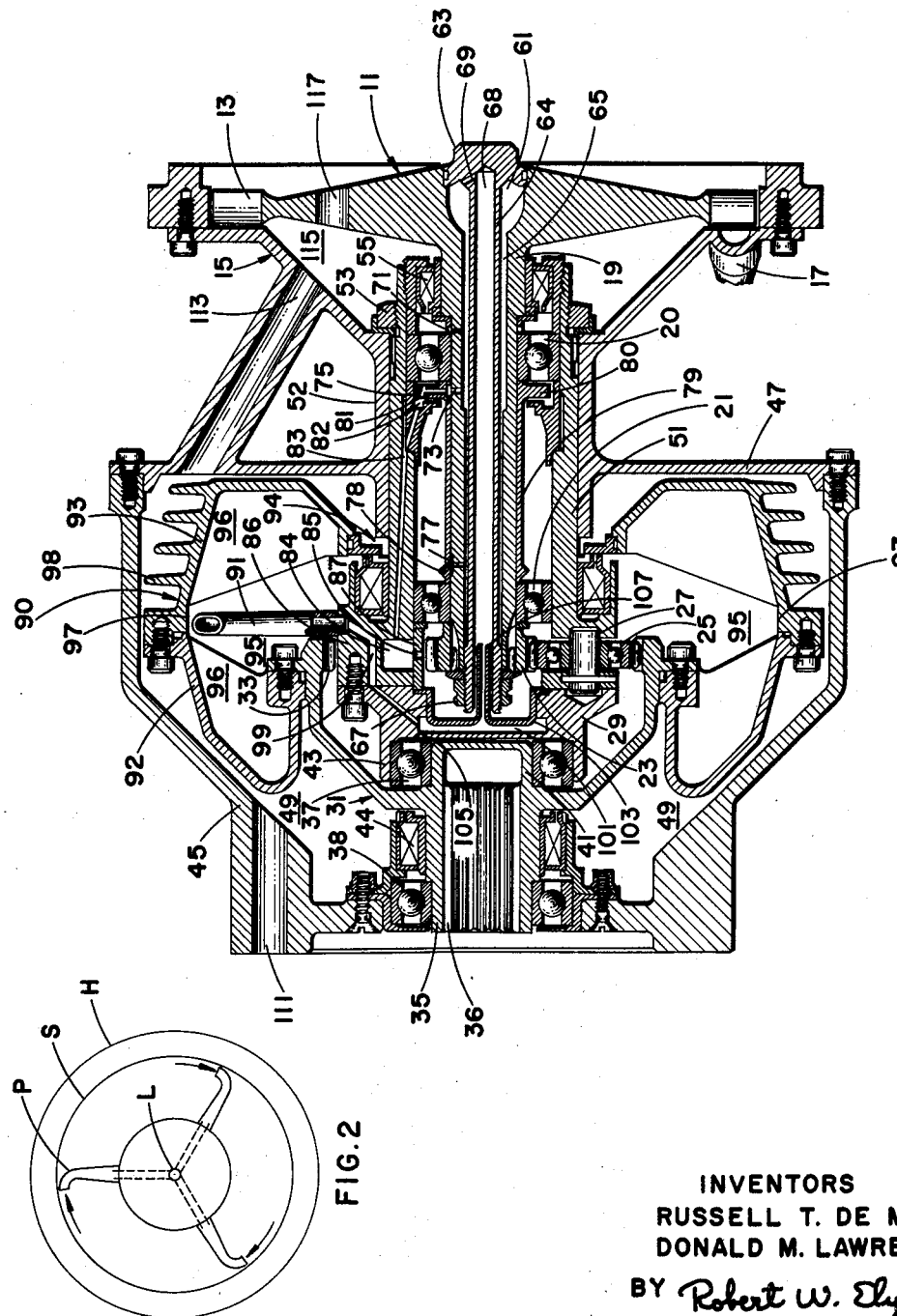
INVENTORS
RUSSELL T. DE MUTH
DONALD M. LAWRENCE
BY Robert W. Ely
ATTORNEY

(header omitted)

3,074,688
GAS TURBINE DRIVE HAVING OIL PUMP
Russell T. DeMuth, Marcy, and Donald M. Lawrence,
New Hartford, N.Y., assignors to The Bendix Corporation, a corporation of Delaware
Filed Apr. 27, 1959, Ser. No. 809,205
7 Claims. (Cl. 253—39.15)

This invention relates to gas turbine drive units and more particularly concerns such drives having means for lubrication and cooling.

In accessory turbine drives for aircraft, it is necessary to provide a source of pressurized oil for lubrication and cooling which remains operative under zero "G" conditions and under any attitude of the aircraft. Large pressurized storage reservoirs and means for attitude positioning have been used. Also positive displacement pumps and complex additional gearing have been used to obtain a pressurized oil source. The resulting disadvantages such as external equipment, weight penalties and apparatus complexities are apparent.

The primary object of the present invention is to provide improved means for supplying pressurized oil in drive units which are subject to zero "G" conditions and changes in attitude.

A further object is to provide a gas turbine drive unit for aircraft which has improved means for direct lubrication and cooling by means of centrifugally-pressurized oil.

Another object is the provision of an improved aircraft gas turbine drive unit having a self-contained means for providing pressurized oil and having an arrangement for cooling the turbine wheel.

A further object is to provide an improved aircraft turbine drive unit having a forced-feed oil circuit which includes two pumps in series.

An additional object is the provision of an aircraft gas turbine drive unit having a planetary gear system which has improved means for cooling the turbine wheel and for lubricating bearings and gears by using a closed oil circuit.

The achievement of the above objects along with the features and advantages of the invention will be apparent from the following description and accompanying drawing in which:

FIG. 1 is side cross-sectional view of a gas turbine drive unit and shows means for centrifugally-pressurizing oil and circulating the oil to elements requiring lubrication and cooling and FIG. 2 is a schematic transverse showing of the rotating sump and stationary pick-up scoops which collect centrifugally-pressurized oil.

Referring to FIG. 1, turbine wheel 11 having blades 13 is encased by turbine housing 15, which has gas nozzles 17 (one appearing) for driving the turbine wheel 11. The turbine wheel has an integral hollow shaft 19 which is rotatably mounted by turbine bearing 20 and pinion bearing 21. Shaft 19 extends to the left and terminates in pinion 23 which drives three planetary gears 25 (one of which appears). Gears 25 are mounted on fixed axles 27 which extend to the right from plate member 29. A rotatable conical output member 31 extends over or overhangs the gears 25 and has a ring gear 33 which is driven by the planetary gears 25 to complete the planetary gear system. Otuput member 31 has an extension 35 having internal splines 36 so that the output of the unit can be connected to a generator, pump or other device (not shown).

The stationary plate member 29 supports bearing 37 which, along with grease-sealed bearing 38, rotatably mounts the conical output member 31. Bearing 37 extends between an axial extension 41 of output member 31 and a date member extension 43 which is radially-outward of extension 41. A seal 44 contacts the output member 31 and is carried by gear housing 45 which connects to a lateral flange 47 of turbine housing 15 to provide an annular cooling chamber 49. A support sleeve 51 is mounted within the tubular part 52 of turbine housing 15 and is positioned by locking nut 53 to provide stationary support means. Sleeve 51 directly supports the turbine bearing 20 and the pinion bearing 21. Member 29 and planetary pinion axles 27 are supported by the pinion end of sleeve 51. At the turbine end of the sleeve, a seal 55 is provided between the sleeve 51 and shaft 19.

Turbine wheel 11 has an axial cavity or cooling chamber 61 which is sealed off by the right end 63 of a tubular rod 64. Rod 64 extends through the hollow turbine shaft 19 in spaced relation to the interior of the shaft 19 to provide an annular oil return passage 65 which is closed at the left by rod 64. The pinion end of the rod is axially open and is positioned by nut 67 which abuts pinion 23. Oil delivered to the interior or oil delivery passage 68 of the rod 64 flows through lateral port 69 into the turbine wheel cavity 61 for cooling and then to the oil return passage 65. From this annular passage, oil can flow through a first side port 71 in the shaft to the turbine side of bearing 20, through second side port 73 to an impeller pump 75 on the shaft 19 and through a third side port 77 to bearing nozzle 78. Pump 75 and nozzle 78 are formed in a rotating sleeve 79 which is mounted on shaft 19. Pump 75 is formed in an annular flange 80 and has a passage 81 arranged to discharge into a collector recess 82 in a radially inwardly extension of supporting sleeve 51. Three equi-spaced axial passages 83 (one shown) in sleeve 51 connects recess 82 with three pinion-lubricating chambers 84 (one appearing) each of which has an outlet 85 for directing oil onto pinion 23. Chambers 84 are formed by cups in three extensions 86 of support sleeve 51 and plates 87 which cover the cup openings and have outlets 85 therein. It is to be noted that pump 75 increases the pressure on the oil so that it can move radially-inward against centrifugal action in chamber 84 to the pinion 23 which requires force-fed lubrication.

The means for supplying pressurized oil to the interior of tube 64 under zero "G" and in any attitude includes a rotatable oil sump 90 and three equi-spaced stationary scoops 91 (one shown) which extend radially from the pinion end of the support sleeve 51. The sump 90 is formed by two annular cup-like members 92, 93 which encase the planetary gearing. Member 92 is attached to the output member 31 adjacent the ring gear 33 while member 93 is attached to the periphery of member 92 and seals against the stationary supporting sleeve 51 by means of seal 94. The sump chamber 95 is axially divided by baffles 96 at each side of scoops 91 whereby oil mist can be collected and directed to the inclined peripheral walls and oil collecting surface 97 outwardly of the tips of the oil scoops 91. Heat removal from the sump is aided by fins 98 on member 93. The centrifugally-pressurized oil flows radially inward through hollow scoops 91 to passages 99 in the pinion end of the support sleeve 51 and in the plate member 29 to an axial distributing chamber 101 formed by the member 29 and a nozzle plate 103. A port 105 in the end wall of member 29 directs oil onto bearing 37. Nozzle 107 directs oil to the interior of tube 64 and is spaced sufficiently close to the interior of the tube so that a fluid seal or restriction results.

In FIG. 2 the method of centrifugally pressurizing oil, picking up the oil having a pressure head and the movement of the oil radially-inwardly is schematically shown. Thus, the rotating sump S within stationary housing H causes the oil to be centrifuged outwardly and the pressurized oil enters the inlets of the stationary pick-up scoops P and moves radially-inwardly under the pressure head to the lubricating and cooling passage L.

Referring again to FIG. 1, inlet passage 111 in the left end of the gear housing 45 is used to admit a pressurized cooling gas to the cooling chamber 49 in which the oil sump 90 rotates. An outlet pipe 113 connects the cooling chamber 49 to the turbine chamber 115 back of the turbine wheel 11. Turbine wheel 11 has three equi-spaced openings 117 in the disc part (one appearing) for passage of the cooling gas from the cooling chamber 49 to the low-pressure discharge side of the turbine wheel 11.

In operation, the turbine drive unit is energized by hot gases from nozzles 17 impinging on the blades 13 of the turbine wheel 11. The rotating wheel 11 causes pinion 23 to drive gears 25 which in turn drive the output member 31 through ring gear 33. High speed rotation of the oil sump 90 which is carried by the ring-gear output member 31 results. The barriers 96 within the sump chamber 95 collect oil droplets from oil mist and so assist in the oil being moved toward the outermost radius or surface 97 due to centrifugal force. The predetermined amount of oil assumes a sharply-defined inner radius which is radially inward of the inlets to the scoops 91. Since centrifuged oil assumes the same position in relation to the rotational axis, and has a centrifugal head, the oil level or position and pressure are independent of the attitude of the vehicle in which the unit is mounted and gravity conditions. As the oil rotates, scoops 91 collect the oil under the centrifugal head and direct it through passages 99 to axial chamber 101. Port 105 provides lubrication of bearing 37. The remainder of the pressurized oil flows through nozzle 107, tube 64 and lateral port 69 into cavity or cooling chamber 61 where it absorbs heat from the turbine wheel 11. From cavity 61, the oil flows through annular return passage 65 and axially-spaced side ports 71, 73 and 77. Oil flow through the first port 71 cools and lubricates bearing 20 and it is scavenged by the action of pump 75. Second port 73 provides a pressurized oil supply for rotating pump 75 which discharges into collector recess 82. It is to be noted that centrifugal pressurizing means including scoops 91 provide a pressurized oil supply to pump 75 for further pressurizing. Oil from recess 82 moves axially and then radially-inwardly through passage 83, chamber 84 and outlet 85 to lubricate the pinion gear 23. From the third side port 77, the oil is discharged through nozzle 78 and cools and lubricates bearing 21 and then, with oil from pinion 23, is partially misted and moves over gears 25 to the oil sump 90. A compact recirculating system is thus provided. Cooling of the oil is accomplished by moving cooling air through opening 111 over the rotating sump having heat-dissipating fins 98. The cooling air passes through pipes 113 to the space 115 between the turbine wheel 11 and housing 15 and, after assisting in cooling the wheel, is discharged through holes 117 to the exit low-pressure side of the turbine wheel 11.

From the foregoing, it is apparent that lubrication and cooling of friction surfaces and cooling of the turbine wheel are provided by means which is not affected by the attitude of the vehicle carrying the unit or by a zero "G" condition.

It is to be understood that persons skilled in the art can make changes in the disclosed embodiment without departing from the invention defined by the appended claims.

What is claimed is:

1. A gas turbine drive unit for aircraft comprised of a turbine wheel having a drive shaft extending from one side, planetary gear means connected to said drive shaft, said planetary gear means including a conical output member having a ring gear, stationary support means surrounding said shaft and having two spaced bearings rotatably supporting said shaft, an annular oil sump means encasing said gear means and carried by said output member and rotatable therewith, stationary oil scoop means extending radially from said support means into said oil sump means and arranged so that, when said oil sump means is rotated, oil under a centrifugal pressure head is picked up by said scoop means and delivered radially-inwardly under pressure, and lubricating means connected to said oil scoop means and arranged to pass oil to said bearings and said planetary gear means.

2. A gas turbine drive unit for aircraft comprised of a turbine wheel having a drive shaft extending from one side, planetary gear means connected to said drive shaft, said planetary gear means including a conical output member having a ring gear, stationary support means surrounding said shaft and having two spaced bearings rotatably supporting said shaft, an annular oil sump means encasing said gear means and carried by said output member and rotatable therewith, stationary oil scoop means extending radially from said support means into said oil sump means and arranged so that, when said oil sump means is rotated, oil under a centrifugal pressure head is picked up by said scoop means and delivered radially-inwardly under pressure, said turbine wheel having an axial cooling chamber, said shaft having an axial oil delivery passage connected to said cooling chamber in said wheel, first passage means formed in said stationary support and connecting said oil scoop means to said oil delivery passage, and second passage means formed in said drive shaft and arranged to receive oil from said wheel cooling chamber and to pass oil through said shaft bearings and said planetary gear means to said oil sump means.

3. A gas turbine drive unit for aircraft comprised of a turbine wheel having a hollow drive shaft extending from one side, said turbine wheel having an axial cooling cavity connected to the interior of said hollow drive shaft, a tube extending through said shaft and said wheel and arranged to close off said cavity and the end of said drive shaft and to provide an axial oil delivery passage and an annular oil return passage from said cavity, a port in said tube connecting said oil delivery passage to said cavity, annular oil sump means encasing the end of said drive shaft and connected to said drive shaft for rotation thereby, stationary oil scoops extending into said oil sump means so that centrifugally-pressurized oil can be picked up and moved radially-inwardly when said oil sump means is rotated, and passage means formed in said hollow shaft and connected to said oil scoops and arranged to deliver pressurized oil to said oil delivery passage formed by said tube whereby oil passes through said tube and said turbine wheel cooling cavity to said oil return passage.

4. A gas turbine drive unit for aircraft comprised of a turbine wheel having a hollow drive shaft extending from one side, said turbine wheel having an axial cooling cavity connected to the interior of said hollow drive shaft, a tube extending through said shaft and said wheel and arranged to close off said cavity and the end of said drive shaft and to provide an axial oil delivery passage and an annular oil return passage from said cavity, a port in said tube connecting said oil delivery passage to said cavity, support means including two bearings supporting said shaft at axially-spaced locations, annular oil sump means encasing the end of said drive shaft and connected to said drive shaft for rotation thereby, stationary oil scoops extending into said oil sump means so that centrifugally-pressurized oil can be picked up and moved radially-inwardly when said oil sump means is rotated, passage means formed in said hollow shaft and connected to said oil scoops and arranged to deliver pressurized oil to said oil delivery passage formed by said tube whereby oil passes through said tube and said turbine wheel cooling cavity to said oil return passage, lubricating ports through said shaft for delivery of oil from said oil return passage to the turbine sides of said bearings, and said support means providing access to said oil sump means for the return of oil from said bearings.

5. A gas turbine drive unit for aircraft comprised of a gas turbine wheel having a shaft which terminates with drive pinion; tubular support means encasing said shaft; axially-spaced bearings between said support means and said shaft rotatably supporting said shaft and providing a turbine bearing adjacent said turbine and a pinion bearing adjacent said pinion; a plate member mounted on the pinion end of said support means; a conical output member encasing said plate member and having a ring gear which overhangs the pinion end of said support means; planetary gears mounted in the pinion end of said support means and connecting said drive pinion and said ring gear; an annular sump structure having one end connected to said conical output member for rotation therewith and having its other end sealed against said support means adjacent the pinion end thereof; oil scoops connected to said support means and extending to the outermost part of said sump structure so that centrifugally-pressurized oil will be collected and moved radially inward in said scoops; said shaft and said wheel having an axial oil delivery passage formed at the juncture thereof, a wheel cooling chamber connected to said delivery passage and an annular oil return passage around said delivery passage extending from said chamber to adjacent said drive pinion; passage means formed in said support means and said plate member constructed to pass oil from said scoops to said oil delivery passage in said shaft so that oil can flow to said wheel cooling chamber; a first side port in said tubular support means arranged to pass oil from said oil return passage to the turbine side of said turbine bearing; an impeller pump having a radial passage formed in said shaft adjacent the pinion side of said turbine bearing; a second side port formed in said shaft connecting said oil return passage to said pump; said support means having an inwardly-projecting collector recess formed therein at the pinion side of said pump; said pump being constructed to discharge into said recess; passage means formed in said support means arranged to pass oil from said collector recess to said pinion gear; and a third side port formed in said shaft arranged to direct oil to the turbine side of said pinion bearing from said oil return passage.

6. A gas turbine drive unit for aircraft comprised of a turbine wheel having a drive shaft extending from one side and terminating in a drive end, stationary support means including bearings supporting said shaft, oil sump means providing an annular oil chamber and connected to said drive shaft for rotation thereby, oil scoop means mounted on and extending radially from said stationary support means to the radially-outer part of said oil chamber so that centrifugally-pressurized oil in said oil chamber can be picked up and moved radially inward when said oil sump means is rotated, lubricating means connected to said oil scoop means and including passages formed therein arranged to pass oil to said bearings and then to said oil chamber, said shaft having an axial oil passage formed therein which is open at said drive end, tube means carried by said support means and connected to said oil scoop means and passages formed in said support means constructed and arranged to deliver oil into the open end of said axial oil passage in said shaft when said shaft is rotating, an impeller pump mounted on said shaft and connected to said axial oil passage, and oil collecting means carried by said support means and arranged to collect the discharge from said impeller pump.

7. A gas turbine drive unit for aircraft comprised of a turbine wheel having a drive shaft extending from one side and terminating in a drive end, stationary support means including bearings supporting said shaft, oil sump means providing an annular oil chamber and connected to said drive shaft for rotation thereby, oil scoop means mounted on and extending radially from said stationary support means to the radially-outer part of said oil chamber so that centrifugally-pressurized oil in said oil chamber can be picked up and moved radially inward when said oil sump means is rotated, lubricating means connected to said oil scoop means and including passages formed therein arranged to pass oil to said bearings and then to said oil chamber including a housing means enclosing said oil sump means and providing a cooling chamber, an inlet to said cooling chamber and an outlet pipe connected to said chamber arranged to flow a gas over said sump means, said turbine wheel having a housing providing a turbine chamber, said turbine wheel having a disc part including a plurality of transverse openings provided therein, said outlet pipe being connected to said turbine chamber whereby gas from said cooling chamber can flow over the rotary sump chamber through said turbine wheel to the low-pressure discharge side of said turbine wheel.

References Cited in the file of this patent

UNITED STATES PATENTS

| | | |
|---|---|---|
| 1,766,686 | Redmond | June 24, 1930 |
| 2,064,070 | Mapes et al. | Dec. 15, 1936 |
| 2,190,254 | Caproni | Feb. 13, 1940 |
| 2,289,440 | Kugel | July 14, 1942 |
| 2,403,579 | Carpenter | July 9, 1946 |
| 2,480,095 | Buchi | Aug. 23, 1949 |
| 2,484,955 | Morton | Oct. 18, 1949 |
| 2,516,200 | Geyer | July 25, 1950 |
| 2,554,368 | Ledwith | May 22, 1951 |
| 2,606,501 | Dreibelbis | Aug. 12, 1952 |
| 2,633,327 | McDowell | Mar. 31, 1953 |
| 2,693,248 | Gaubatz et al. | Nov. 2, 1954 |
| 2,789,021 | Pedersen | Apr. 16, 1957 |
| 2,823,849 | Muller | Feb. 18, 1958 |
| 2,883,151 | Dolida | Apr. 21, 1959 |

FOREIGN PATENTS

| | | |
|---|---|---|
| 661,228 | Great Britain | Nov. 21, 1951 |
| 2,651,553 | Great Britain | Sept. 8, 1953 |